(12) United States Patent
Kadobayashi

(10) Patent No.: US 9,769,331 B2
(45) Date of Patent: Sep. 19, 2017

(54) IMAGE FORMING APPARATUS WITH IMPROVED MEMORY ALLOCATION TO MINIMIZE DELAY IN PROCESSING IMAGES

(71) Applicant: KYOCERA Document Solutions Inc., Osaka (JP)

(72) Inventor: Izumi Kadobayashi, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 14/988,620

(22) Filed: Jan. 5, 2016

(65) Prior Publication Data
US 2016/0205275 A1     Jul. 14, 2016

(30) Foreign Application Priority Data
Jan. 8, 2015    (JP) ................................ 2015-002054

(51) Int. Cl.
| | |
|---|---|
| *G06F 3/12* | (2006.01) |
| *H04N 1/00* | (2006.01) |
| *H04N 1/21* | (2006.01) |
| *H04N 1/44* | (2006.01) |

(52) U.S. Cl.
CPC ..... *H04N 1/00204* (2013.01); *H04N 1/00411* (2013.01); *H04N 1/21* (2013.01); *H04N 1/4406* (2013.01); *H04N 2201/0094* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0086046 A1* | 4/2007 | Kim | ...................... | G06F 21/608 358/1.15 |
| 2007/0258109 A1* | 11/2007 | Sasaki | .................... | G06K 15/00 358/1.16 |
| 2009/0009803 A1* | 1/2009 | Takeuchi | ........... | H04N 1/00408 358/1.15 |
| 2009/0066988 A1* | 3/2009 | Imaizumi | ............. | H04N 1/2166 358/1.13 |
| 2009/0244621 A1* | 10/2009 | Young | .................. | G06K 15/005 358/1.16 |

FOREIGN PATENT DOCUMENTS

JP     11-205513     7/1999

* cited by examiner

*Primary Examiner* — Henok A Shiferaw

(57) ABSTRACT

An image forming apparatus includes a communication device, a RAM, a job managing unit, and an external temporary memory area managing unit. The communication device performs data communication with an external user terminal apparatus. The job managing unit allocates a memory area required to execute a requested job and executes the requested job. When it is determined that the memory area can't be allocated in the RAM owing to shortage of a free area in the RAM, the external temporary memory area managing unit (a) identifies a user who issued a job execution request on the basis of user authentication, (b) identifies a user terminal apparatus corresponding the identified user, and (c) uses a storage device of the identified user terminal apparatus as a part or all of a memory area required to execute the requested job on the basis of data communication performed by the communication device.

8 Claims, 4 Drawing Sheets

IMAGE FORMING APPARATUS WITH IMPROVED MEMORY ALLOCATION TO MINIMIZE DELAY IN PROCESSING IMAGES

CROSS-REFERENCE TO RELATED APPLICATIONS

This application relates to and claims priority rights from Japanese Patent Application No. 2015-002054, filed on Jan. 8, 2015, the entire disclosures of which are hereby incorporated by reference herein.

BACKGROUND

1. Field of the Present Disclosure

The present disclosure relates to an image forming apparatus.

2. Description of the Related Art

When executing a job such as a print job or a scan job, an image forming apparatus such as a multi function peripheral allocates a memory area required for the job in a DRAM (Dynamic Random Access Memory), and executes the job using the memory area as a temporal work memory.

When in a built-in printing device a trouble such as jam occurs and thereby printing is suspended, an image forming apparatus temporarily stores image data of a document image scanned in a copy job into an external host apparatus and continues to scan the document images, and afterward resumes the printing after dissolving the trouble.

In an image forming apparatus capable of executing plural jobs in parallel, memory areas must be allocated for all the jobs in a DRAM. However, if the DRAM has small capacity, a memory area can not be allocated with an adequate size for a subsequently executed job and therefore execution of a subsequently executed job or setting of a job (e.g. resolution of a scan job or the like) may be limited.

SUMMARY

An image forming apparatus according to an aspect of the present disclosure includes a communication device, a RAM, a job managing unit, and an external temporary memory area managing unit. The communication device is configured to perform data communication with an external user terminal apparatus. The job managing unit is configured to allocate a memory area required to execute a requested job and execute the requested job. The external temporary memory area managing unit is configured to, when it is determined that the memory area can not be allocated in the RAM owing to shortage of a free area in the RAM, (a) identify a user on the basis of user authentication, the user issuing a job execution request, (b) identify a user terminal apparatus corresponding the identified user, and (c) use a storage device of the identified user terminal apparatus as a part or all of a memory area required to execute the requested job on the basis of data communication performed by the communication Device.

These and other objects, features and advantages of the present disclosure will become more apparent upon reading of the following detailed description along with the accompanied drawings.

DETAILED DESCRIPTION

Hereinafter, an embodiment according to aspects of the present disclose will be explained with reference to drawings.

Figure 1:
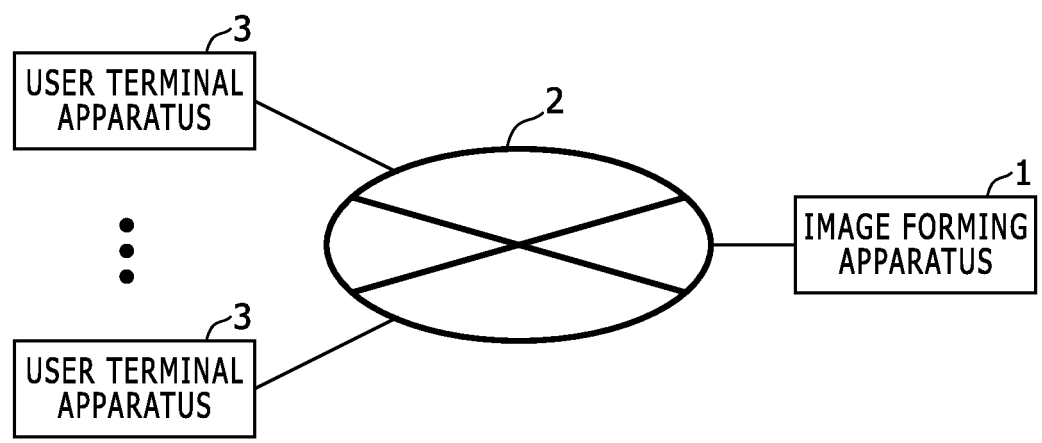
FIG. 1 shows a block diagram that indicates a configuration of an image forming system that includes an image forming apparatus according to an embodiment of the present disclosure.

FIG. 1 shows a block diagram that indicates a configuration of an image forming system that includes an image forming apparatus according to an embodiment of the present disclosure. In the system shown in FIG. 1, an image forming apparatus 1 is connected to a network 2. In the present embodiment, the image forming apparatus 1 is a multi function peripheral capable of executing plural jobs in parallel. The network 2 is a local area network such as intranet using LAN (Local Area Network). A user terminal apparatus 3 is a personal computer or the like used by a registered user of the image forming apparatus 1, connected to the network 2, capable of communicating through the network 2, and in which an application and a driver of the image forming apparatus 1 has been installed.

Figure 2:
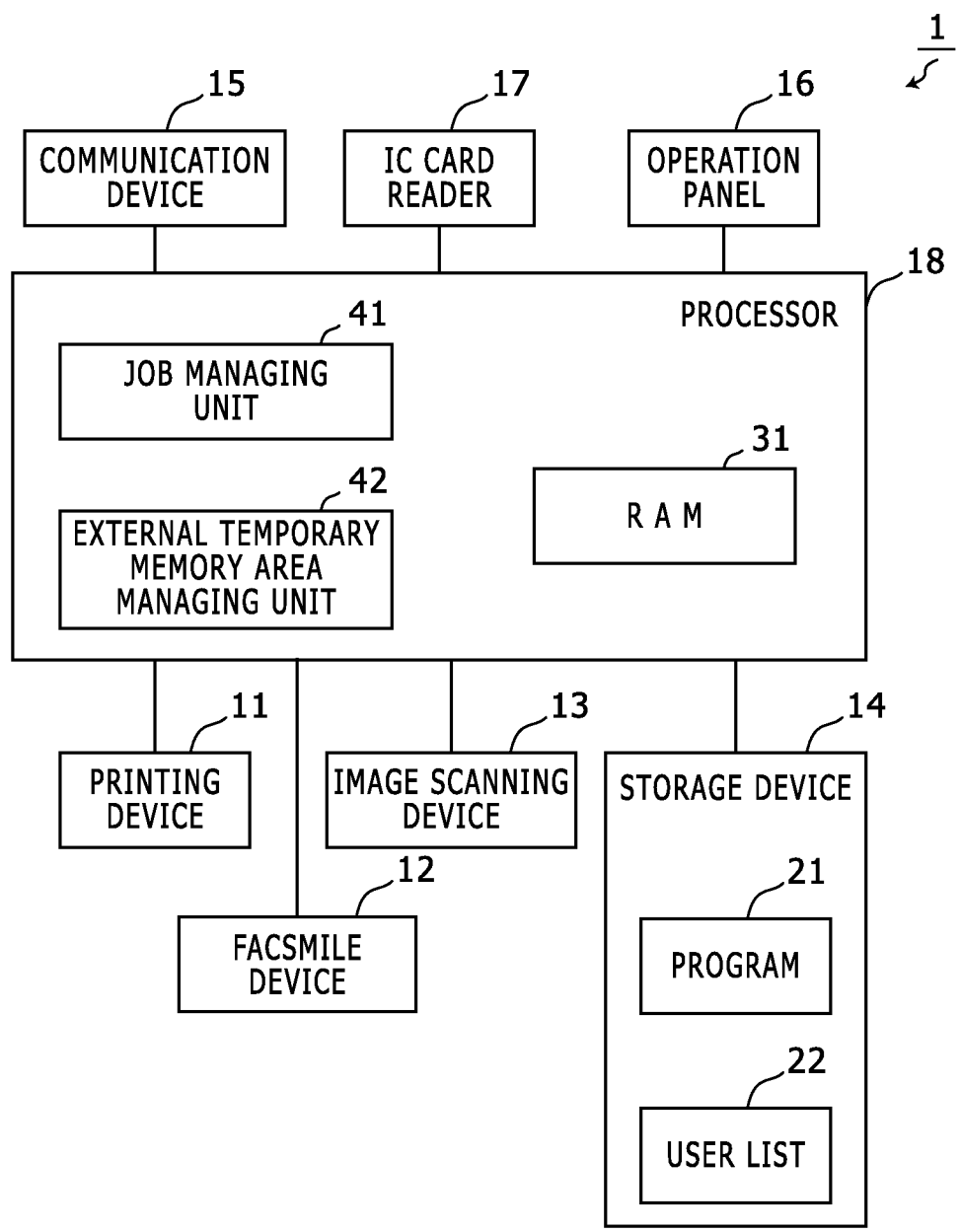
FIG. 2 shows a block diagram that indicates a configuration of an image forming apparatus 1 according to an embodiment of the present disclosure.

FIG. 2 shows a block diagram that indicates a configuration of the image forming apparatus 1 according to an embodiment of the present disclosure. As shown in FIG. 2, the image forming apparatus 1 includes a printing device 11, a facsimile device 12, an image scanning device 13, a storage device 14, a communication device 15, an operation panel 16, an IC card reader 17, and a processor 18.

The printing device 11 is an internal device that prints each image based on print image data on each paper sheet using electrophotography.

The facsimile device 12 is an internal device that transmits and receives an image as a facsimile signal through a public telephone line using a modem.

The image scanning device 13 is an internal device that optically scans a document image of a document and generates an image data file of the document image.

The storage device 14 is a non-volatile storage device in which a user list 22 of a registered user and the like have been stored.

The program 21 is a program to be executed by the processor 18.

The user list 22 includes a user ID of a registered user, a user name of the registered user, network identification information (e.g. an IP address) of the user terminal apparatus 3 of the registered user, and the like so as to associate them with each other.

The communication device 15 is a circuit that is connected to the network 2 and performs data communication with another apparatus (the user terminal apparatus 3 or the like) connected to the network 2. For example, a network interface is used as the communication device 15.

The operation panel 16 includes a display device such as a liquid crystal display that displays sorts of information to a user, and an input device such as a touch panel or a hard key that receives a user operation.

The IC card reader 17 reads out identification information of a user from an IC card unique to the user.

The processor 18 includes a CPU (Central Processing Unit), a ROM (Read Only Memory), and a RAM (Random Access Memory) 31, loads a program from the storage device 14, the ROM or the like to the RAM 31, and executes the program with the CPU to embody various processing units. It should be noted that the RAM 31 is fixed on a circuit board on which the processor 18 is fixed.

In the present embodiment, the processor 18 executes the program 21 and thereby embodies a job managing unit 41, an external temporary memory area managing unit 42, and the like.

On the basis of a job request received by the communication device 15 or a job request received by the operation panel 16, the job managing unit 41 executes a requested job using the printing device 11, the facsimile device 12, the image scanning device 14 and/or the like. In such a process, the job managing unit 41 allocates a memory area required to execute the requested job and executes the requested job using the memory area. If there is an adequate free area in the RAM 31, the memory area is allocated in the RAM 31. If a memory area required to execute a job in the RAM 31 is allocated, the job managing unit 41 makes the job progress with storing data generated in the executing job.

The external temporary memory area managing unit 42 is capable of communicating with the user terminal apparatus 3 using the communication device 15. When it is determined that the memory area can not be allocated in the RAM 31 owing to shortage of a free area in the RAM 31, the external temporary memory area managing unit 42 (a) identifies a user who issued the job execution request on the basis of user authentication, (b) refers to the user list 22 and thereby identifies the user terminal apparatus 3 corresponding the identified user, and (c) uses a storage device (a hard disk drive, SSD (Solid State Drive) or the like) of the identified user terminal apparatus 3 as a part or all of a memory area required to execute the requested job on the basis of data communication performed by the communication device 15.

The user authentication in this process is performed either when logging in the image forming apparatus 1 or when determining that the memory area can not be allocated in the RAM 31 owing to shortage of a free area in the RAM 31. For example, as this user authentication, user identification information read from an IC card unique to a user by an IC card reader is compared with user identification information registered in the user list 22. In this manner, job data is transmitted to the user terminal apparatus 3 after the user authentication, and therefore it is difficult for a malicious third party to obtain the job data.

In this process, for example, the external temporary memory area managing unit 42 communicates with a specific application in the user terminal apparatus 3, and through the application, uses a memory area allocated by the application as a part or all of a memory area required to execute the requested job.

Further, in the present embodiment, if a print job is in execution when starting executing a new job, the job managing unit 41 determines whether a size of a memory area allocated in the RAM 31 for the print job in execution exceeds a predetermined threshold value or not. If the size exceeds the predetermined threshold value, then the job managing unit 41 does not allocate a memory area required to execute the new job in the RAM 31, even if there is a free area larger than a memory area required to execute the new job in the RAM 31. Contrarily, if the size is equal to or less than the predetermined threshold value, then the job managing unit 41 allocates a memory area required to execute the new job in the RAM 31, if there is a free area larger than a memory area required to execute the new job in the RAM 31.

If it is determined that the memory area can be allocated in the RAM 31 for the requested job but the size of the memory area allocated in the RAM 31 for a print job in execution exceeds the predetermined threshold value, then the external temporary memory area managing unit 42 (a) identifies a user who issued the job execution request on the basis of user authentication, (b) identifies the user terminal apparatus 3 corresponding the identified user, and (c) uses a storage device of the identified user terminal apparatus 3 as a part or all of a memory area required to execute the requested job on the basis of data communication performed by the communication device 15.

A memory area required for a print job increases and/or decreases along progress of the job, and therefore if shortage of a free area for a memory area required for the print job is predicted, then as mentioned, the storage device of the user terminal apparatus 3 is used as a memory area required for a subsequently-starting job, even if a memory area to execute the subsequently-starting job can be allocated.

In the present embodiment, if a print job is in execution when starting the execution of a new job, then the job managing unit 41 determines whether a residual amount of printing paper sheets used for a print job in execution is equal to or less than a predetermined threshold value or not. For example, the residual amount of printing paper sheets can be determined by using a sensor arranged on a sheet cassette. If the residual amount is equal to or less than the predetermined threshold value, then the job managing unit 41 does not allocate a memory area required to execute the new job in the RAM 31, even if there is a free area larger than a memory area required to execute the new job in the RAM 31. Contrarily, if the residual amount exceeds the predetermined threshold value, then the job managing unit 41 allocates a memory area required to execute the new job in the RAM 31, if there is a free area larger than a memory area required to execute the new job in the RAM 31.

If the memory area can be allocated in the RAM 31 for the requested new job but the residual amount of printing paper sheets used for a print job in execution equal to or less than the predetermined threshold value, then the external temporary memory area managing unit 42 (a) identifies a user who issued the job execution request on the basis of user authentication, (b) identifies a user terminal apparatus corresponding the identified user, and (c) uses a storage device of the identified user terminal apparatus 3 as a part or all of a memory area required to execute the requested job on the basis of data communication performed by the communication device 15.

When the residual amount of printing paper sheets used for a print job in execution equal to or less than the predetermined threshold value, it is predicted to increase a memory area required for the print job. Specifically, if all printing paper sheets runs out before finishing the print job, then the printing is stopped; and therefore, a page buffer will be released when finishing printing one page but the releasing is not done and then a page buffer for a subsequent page is additionally allocated, and consequently, a memory area required for the print job increases. Thus, in such a case, even if a memory area required to execute a subsequently-started job can be allocated, as mentioned, a storage device of the user terminal apparatus 3 is used as a memory area for the subsequently-started job.

Further, in the present embodiment, if the job managing unit 41 determines that the memory area can not be allocated in the RAM 31 for a new job owing to shortage of a free area in the RAM 31, then the job managing unit 41 monitors a size of a free area in the RAM 31, and allocates the memory area required for the new job when the size of the free area becomes equal to or larger than a size of the memory area required for the new job.

If a print job is in execution, when the size of the free area becomes equal to or larger than a size of the memory area required for the new job and a size of the memory area allocated for the print job in the RAM 31 becomes equal to or less than the aforementioned threshold value, the job managing unit 41 allocates the memory area for the new job.

In addition, the job managing unit 41 (a) stores data generated in execution of the requested job to the storage device in the user terminal apparatus 3 using the external temporary memory area managing unit 42, (b) upon allocating the memory area required for the job in the RAM31, reads the data from the storage device in the user terminal apparatus 3 and stores the data to the memory area allocated in the RAM 31 when allocating the memory area using the external temporary memory area managing unit 42.

Figure 3:
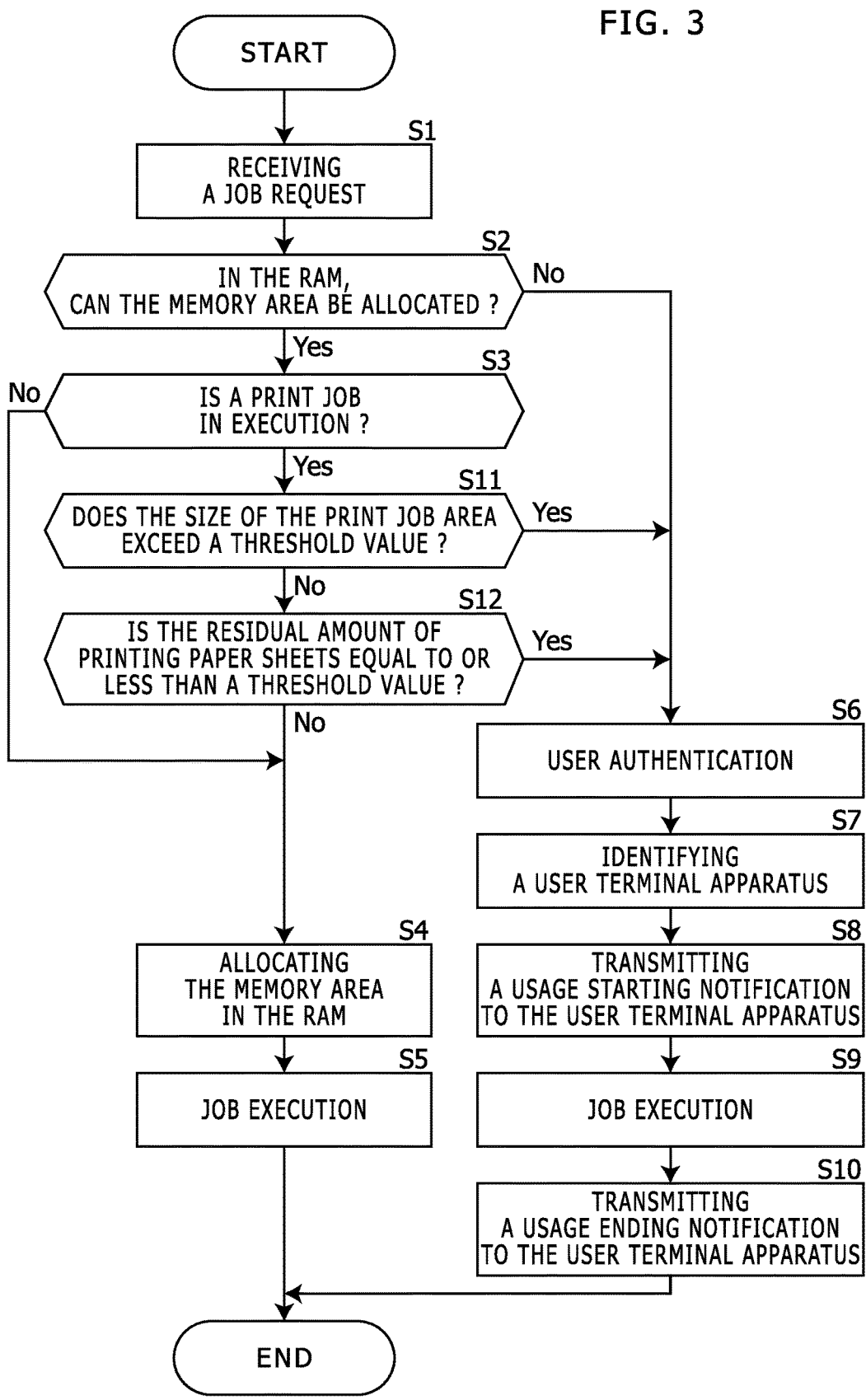
FIG. 3 shows a flowchart that explains a behavior of the image forming apparatus 1 shown in FIG. 2.

The following part explains a behavior of the aforementioned image forming apparatus 1. FIG. 3 shows a flowchart that explains a behavior of the image forming apparatus 1 shown in FIG. 2.

When receiving a job request (e.g. a job request of a scan job) (in Step S1), the job managing unit 41 identifies a size of a free area in the RAM 31, and determines whether or not the identified size of the free area is equal to or larger than a size of a memory area required to execute a job requested by the received job request (i.e. a predetermined size required for starting the execution of the job), namely whether a memory area for the requested job can be allocated in the RAM 31 or not (in Step S2).

If the job managing unit 41 determines that a memory area for the requested job can be allocated in the RAM 31, then the job managing unit 41 determines whether a print job is in execution or not (in Step S3).

If no print jobs are in execution, then the job managing unit 41 allocates a memory area required to execute the requested job in the RAM 31 (in Step S4), and executes the requested job (in Step S5).

Contrarily, in Step S2, if the job managing unit 41 determines that a memory area for the requested job can not be allocated in the RAM 31, then the external temporary memory area managing unit 42 identifies a user who requested the requested job on the basis of user authentication (in Step S6), and identifies the user terminal apparatus 3 of the identified user (in Step S7).

Subsequently, the external temporary memory area managing unit 42 transmits a usage starting notification to the identified user terminal apparatus 3 (in Step S8). The user terminal apparatus 3 receives the notification and subsequently allocates a memory area in a built-in storage device.

Subsequently, the job managing unit 41 executes the requested job (in Step S9), and stores data generated by the job in execution into the user terminal apparatus 3 using the external temporary memory area managing unit 42, and if required, reads the data from the user terminal apparatus 3.

Afterward, when the execution of the requested job is finished, the external temporary memory area managing unit 42 transmits a usage ending notification to the user terminal apparatus 3 (in Step S10). The user terminal apparatus 3 receives the notification and subsequently releases the allocated memory area.

On the other hand, in Step S3, if the job managing unit 41 determines that a print job is in execution, then the job managing unit 41 determines whether a size of a memory area allocated in the RAM 31 for the print job (hereinafter, called as a print job area) exceeds a predetermined threshold value or not (in Step S11) and whether a residual amount of printing paper sheets is equal to or less than a predetermined threshold value (in Step S12).

Figure 4:
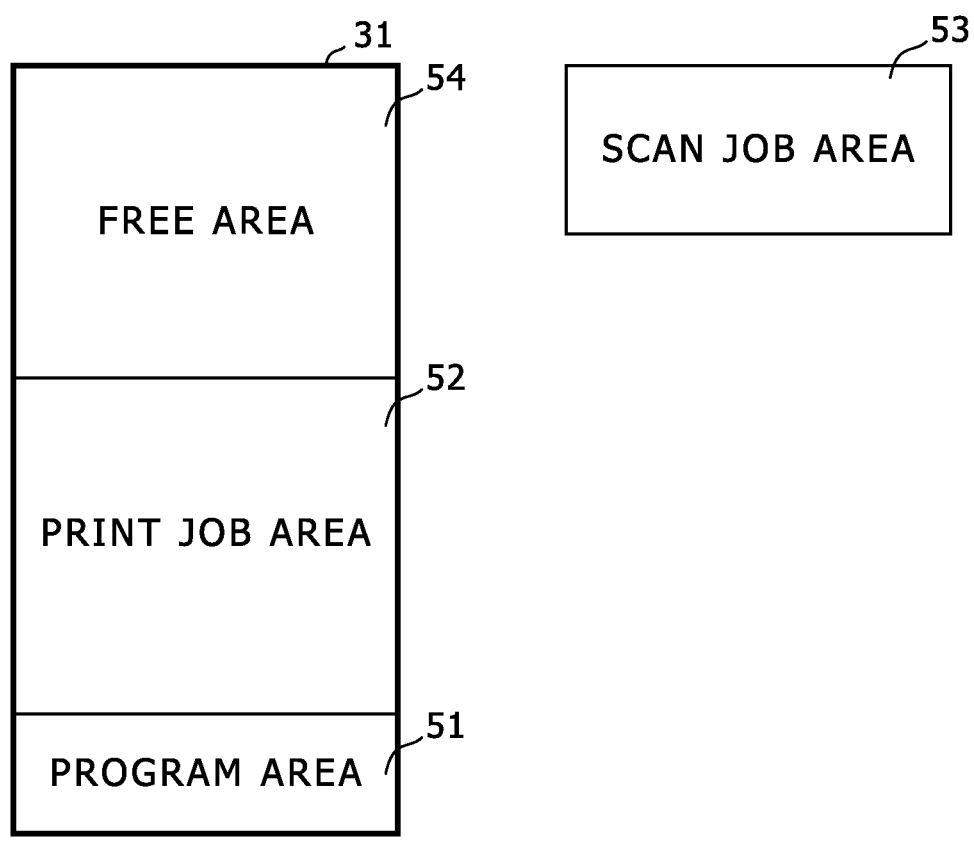
FIG. 4 shows a diagram that indicates an example of a memory map of a RAM 31 shown in FIG. 2.

FIG. 4 shows a diagram that indicates an example of a memory map of a RAM 31 shown in FIG. 2. As shown in FIG. 4, a memory space of the RAM 31 is used for a program area 51 to which a program 21 is loaded, and in the memory space, a print job area 52 has been allocated if a print job is in execution. When starting the execution of the print job, a memory area allocated as the print job area 52 has a size of an initial value, and along progress of the print job, an additional memory area may be allocated if required and/or the allocated memory area may be partially released.

For example, as shown in FIG. 4, even though a size of a memory area required to execute a new scan job (i.e. a scan job area 53) is less than a free area 54, if the job managing unit 41 determines that a size of the print job area 52 exceeds a predetermined threshold value or the job managing unit 41 determines that the residual amount of printing paper sheets is equal to or less than a predetermined threshold value then the job managing unit 41 executes the job while using the user terminal apparatus 3 as a memory area for the requested job, by using the external temporary memory area managing unit 42 (in Steps S6 to S10).

Contrarily, if the job managing unit 41 determines that the size of the print job area does not exceed the predetermined threshold value and the residual amount of printing paper sheets exceeds the predetermined threshold value, then the job managing unit 41 allocates a memory area for the requested job in the RAM 31 and executes the job (in Steps S4 and S5).

It should be noted that, as mentioned, in Step S9, the job managing unit 41 monitors a free area in the RAM 31, and if the free area in the RAM 31 becomes equal to or larger than a size of a memory area for the requested job, then the job managing unit 41 allocates the memory area in the RAM 31. After the allocation, the job managing unit 41 stores data generated in the job into the allocated memory area, and the external temporary memory area managing unit 42 reads data stored for the job in the user terminal apparatus 3 and stores the data in the memory area allocated in the RAM 31. Subsequently, when finishing reading out the data stored for the job in the user terminal apparatus 3, the external temporary memory area managing unit 42 transmits the usage ending notification to the user terminal apparatus 3.

In the aforementioned embodiment, the job managing unit 41 allocates a memory area required to execute a requested job and executes the requested job. When it is determined that the memory area can not be allocated in the RAM 31 owing to shortage of a free area in the RAM 31, the external temporary memory area managing unit 42 (a) identifies a user who issued a job execution request on the basis of user authentication, (b) identifies a user terminal apparatus 3 corresponding the identified user, and (c) uses a storage device of the identified user terminal apparatus 3 as a part or all of a memory area required to execute the requested job on the basis of data communication performed by the communication device 15.

Consequently, even if there is not an adequate free area in the built-in RAM 31, it is possible to execute a job as usual.

The description has been presented for purposes of illustration and description, and is not intended to be exhaustive or limited.

For example, in the aforementioned embodiment, when the job managing unit 41 determines that a memory area can not be allocated to execute a new job owing to shortage of a free area in the RAM 31, if the size of the free area is equal to or larger than a predetermined threshold value, then the job managing unit 41 may allocate a memory area with a predetermined size in the RAM 31, and the external temporary memory area managing unit 42 may use the allocated memory area as a buffer for the transmission of data generated in the job, to be stored in the user terminal apparatus.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
    a communication device configured to perform data communication with an external user terminal apparatus;
    a RAM;
    a job managing unit configured to allocate a memory area required to execute a requested job and execute the requested job; and
    an external temporary memory area managing unit configured to, when it is determined that the memory area cannot be allocated in the RAM owing to shortage of a free area in the RAM, (a) identify a user on the basis of user authentication, the user issuing a job execution request, (b) identify a user terminal apparatus corresponding the identified user, and (c) use a storage device of the identified user terminal apparatus as a part or all of a memory area to be allocated by the job managing unit in order to execute the requested job on the basis of data communication performed by the communication device;
    wherein the job managing unit will allocate memory from said RAM and not from the storage device of the identified user terminal if it is determined that there is enough memory in said RAM to execute said requested job and if it is determined that there is not another job currently being executed using memory of said RAM;
    wherein said image forming apparatus will execute the requested job using the memory allocated by the job managing unit;
    wherein the job managing unit determines whether a size of a memory area allocated in the RAM for another job currently being executed exceeds a predetermined threshold value or not; and
    if it is determined that the memory area can be allocated in the RAM for the requested job but the size of the memory area allocated in the RAM for another job currently being executed exceeds the predetermined threshold value, then the external temporary memory area managing unit (a) identifies a user on the basis of user authentication, the user issuing a job execution request, (b) identifies a user terminal apparatus corresponding the identified user, and (c) use a storage device of the identified user terminal apparatus as a part or all of a memory area to be allocated by the job managing unit in order to execute the requested job on the basis of data communication performed by the communication device;
    wherein the job managing unit will allocate memory from said RAM and not from the storage device of the identified user terminal if it is determined that there is enough memory in said RAM to execute said requested job and it is determined that there is another job currently being executed using memory of said RAM, but the memory size of the job currently being executed does not exceed a threshold value.

2. The image forming apparatus according to claim 1 wherein:
    if the memory area cannot be allocated in the RAM for the requested job, then the job managing unit monitors a size of a free area in the RAM, and allocates the memory area for the requested job when the size of the free area becomes equal to or larger than a size of the memory area for the requested job; and
    the job managing unit (a) stores data generated in execution of the requested job to the storage device in the user terminal apparatus using the external temporary memory area managing unit, (b) reads the data from the storage device in the user terminal apparatus and stores the data to the memory area allocated in the RAM when allocating the memory area using the external temporary memory area managing unit.

3. The image forming apparatus according to claim 1 wherein the external temporary memory area managing unit communicates with a specific application in the user terminal apparatus, and uses a memory area allocated by the application as a part or all of a memory area required to execute the requested job.

4. The image forming apparatus according to claim 1 wherein the user identification is performed either when logging in the image forming apparatus or when determining that the memory area can not be allocated in the RAM owing to shortage of a free area in the RAM.

5. An image forming apparatus, comprising:
    a communication device configured to perform data communication with an external user terminal apparatus;
    a RAM;
    a job managing unit configured to allocate a memory area required to execute a requested job and execute the requested job;
    an external temporary memory area managing unit configured to, when it is determined that the memory area cannot be allocated in the RAM owing to shortage of a free area in the RAM, (a) identify a user on the basis of user authentication, the user issuing a job execution request, (b) identify a user terminal apparatus corresponding the identified user, and (c) use a storage device of the identified user terminal apparatus as a part or all of a memory area to be allocated by the job managing unit in order to execute the requested job on the basis of data communication performed by the communication device;
    wherein the job managing unit will allocate memory from said RAM and not from the storage device of the identified user terminal if it is determined that there is enough memory in said RAM to execute said requested job and if it is determined that there is not another job currently being executed using memory of said RAM;
    wherein said image forming apparatus will execute the requested job using the memory allocated by the job managing unit and
    wherein:
    the job managing unit determines whether a residual amount of printing paper sheets used for a print job in execution is equal to or less than a predetermined threshold value or not; and
    if it is determined that the memory area can be allocated in the RAM for the requested job but the residual amount of printing paper sheets used for a print job in execution equal to or less than the predetermined threshold value, then the external temporary memory area managing unit (a) identifies a user on the basis of user authentication, the user issuing a job execution request, (b) identifies a user terminal apparatus corresponding the identified user, and (c) use a storage device of the identified user terminal apparatus as a part or all of a memory area to be allocated by the job managing unit in order to execute the requested job on the basis of data communication performed by the communication device;

wherein the job managing unit will allocate memory from said RAM and not from the storage device of the identified user terminal if it is determined that there is enough memory in said RAM to execute said requested job and the residual amount of paper sheets exceeds a threshold value.

6. The image forming apparatus according to claim 5 wherein:

if the memory area cannot be allocated in the RAM for the requested job, then the job managing unit monitors a size of a free area in the RAM, and allocates the memory area for the requested job when the size of the free area becomes equal to or larger than a size of the memory area for the requested job; and the job managing unit (a) stores data generated in execution of the requested job to the storage device in the user terminal apparatus using the external temporary memory area managing unit, (b) reads the data from the storage device in the user terminal apparatus and stores the data to the memory area allocated in the RAM when allocating the memory area using the external temporary memory area managing unit.

7. The image forming apparatus according to claim 5 wherein the external temporary memory area managing unit communicates with a specific application in the user terminal apparatus, and uses a memory area allocated by the application as a part or all of a memory area required to execute the requested job.

8. The image forming apparatus according to claim 5 wherein the user identification is performed either when logging in the image forming apparatus or when determining that the memory area can not be allocated in the RAM owing to shortage of a free area in the RAM.

* * * * *